United States Patent
Stein et al.

(10) Patent No.: US 7,566,851 B2
(45) Date of Patent: Jul. 28, 2009

(54) HEADLIGHT, TAILLIGHT AND STREETLIGHT DETECTION

(75) Inventors: Gideon P. Stein, Jerusalem (IL); Ofer Hadassi, Modiin (IL); Noam Ben Haim, Jerusalem (IL); Uri Wolfovitz, Haifa (IL)

(73) Assignee: Mobileye Technologies Ltd., Nicosia (CY)

( * ) Notice: Subject to any disclaimer, the term of this patent is extended or adjusted under 35 U.S.C. 154(b) by 0 days.

(21) Appl. No.: 11/689,523

(22) Filed: Mar. 22, 2007

(65) Prior Publication Data

US 2007/0221822 A1   Sep. 27, 2007

Related U.S. Application Data

(60) Provisional application No. 60/785,351, filed on Mar. 24, 2006, provisional application No. 60/836,670, filed on Aug. 10, 2006.

(51) Int. Cl.
*H01L 27/00* (2006.01)
*B60Q 1/02* (2006.01)

(52) U.S. Cl. .................................. 250/205; 315/82

(58) Field of Classification Search .............. 250/208.1; 340/435–437; 382/104; 701/23, 28, 36, 701/117, 300–302; 356/213, 218, 222, 229
See application file for complete search history.

(56) References Cited

U.S. PATENT DOCUMENTS

| | | | | |
|---|---|---|---|---|
| 5,796,094 A * | 8/1998 | Schofield et al. | ......... | 250/208.1 |
| 6,049,171 A * | 4/2000 | Stam et al. | ............ | 315/82 |
| 6,281,632 B1 * | 8/2001 | Stam et al. | ............ | 315/82 |
| 6,429,594 B1 * | 8/2002 | Stam et al. | ............ | 315/82 |
| 6,587,573 B1 * | 7/2003 | Stam et al. | ............ | 382/104 |
| 6,593,698 B2 * | 7/2003 | Stam et al. | ............ | 315/82 |
| 6,704,621 B1 | 3/2004 | Stein et al. | | |
| 6,728,393 B2 * | 4/2004 | Stam et al. | ............ | 382/104 |

(Continued)

FOREIGN PATENT DOCUMENTS

EP    1513103    3/2005

OTHER PUBLICATIONS

Sakai K et al., "In-Tunnel Traffic Flow Measuring System Using an ITV Camera," Sumitomo Electrical Technical Review, Jan. 1990, pp. 154-160, No. 29, Osaka Japan.

*Primary Examiner*—Thanh X Luu
(74) *Attorney, Agent, or Firm*—The Law Office of Michael E. Kondoudis, PC

(57) ABSTRACT

A method in a computerized system including an image sensor mounted in a moving vehicle. The image sensor captures image frames consecutively in real time. In one of the image flames, a spot is detected of measurable brightness; the spot is matched in subsequent image frames. The image frames are available for sharing between the computerized system and another vehicle control system. The spot and the corresponding spot are images of the same object. The object is typically one or more of headlights from an oncoming vehicle, taillights of a leading vehicle, streetlights, street signs and/or traffic signs. Data is acquired from the spot and from the corresponding spot. By processing the data, the object (or spot) is classified. producing an object classification. The vehicle control system controls preferably headlights of the moving vehicle based on the object classification. The other vehicle control system using the image frames is one or more of: lane departure warning system, collision warning system and/or ego-motion estimation system.

27 Claims, 8 Drawing Sheets

U.S. PATENT DOCUMENTS

| | | |
|---|---|---|
| 6,831,261 B2 | 12/2004 | Schofield et al. |
| 6,882,287 B2 | 4/2005 | Schofield |
| 7,004,606 B2 * | 2/2006 | Schofield .................... 362/460 |
| 7,113,867 B1 | 9/2006 | Stein |
| 7,149,613 B2 * | 12/2006 | Stam et al. .................... 701/36 |
| 2002/0195949 A1 | 12/2002 | Stam et al. |
| 2003/0209893 A1 | 11/2003 | Breed |
| 2004/0143380 A1 | 7/2004 | Stam et al. |

* cited by examiner

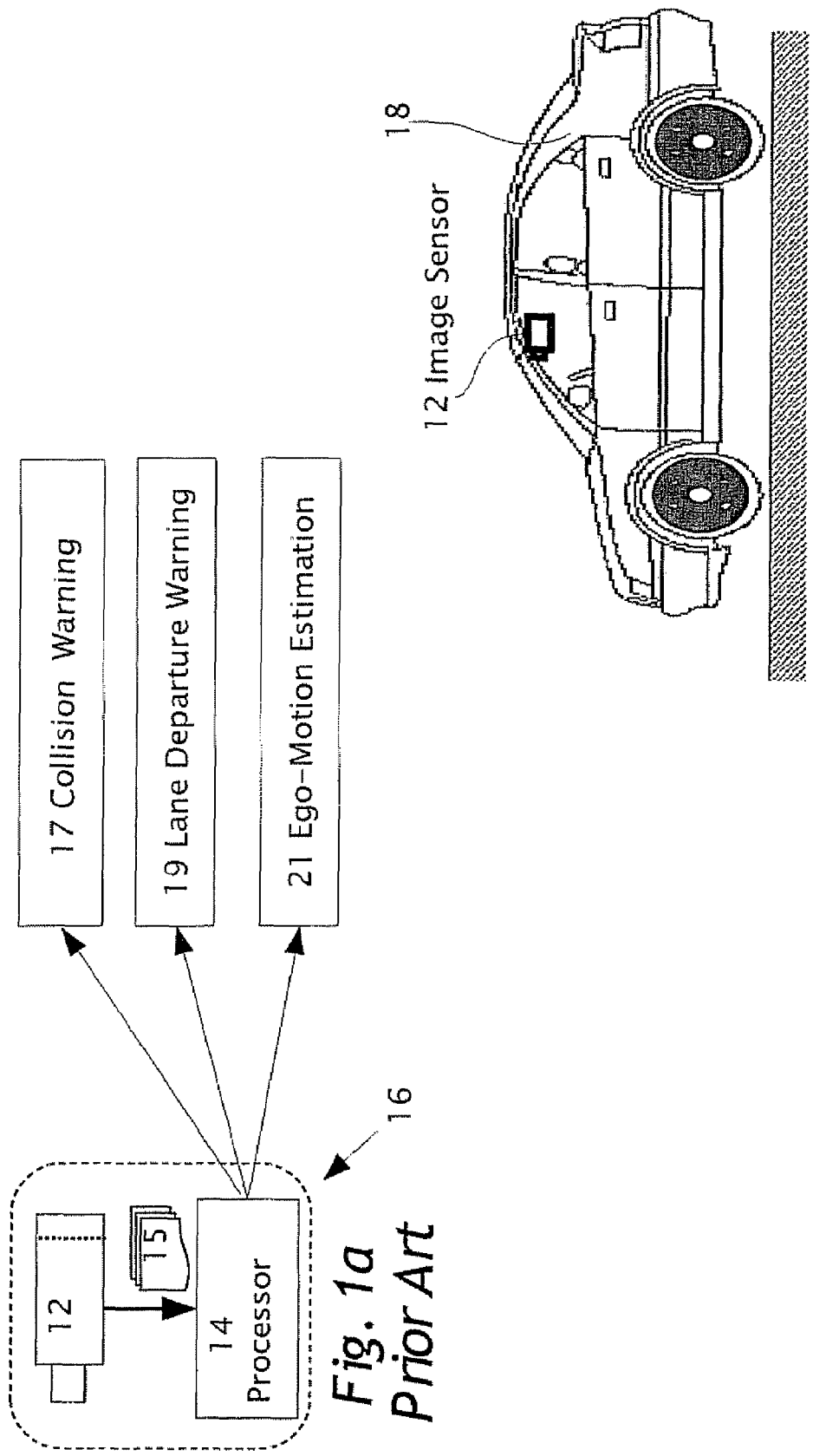

Dark Road Scene

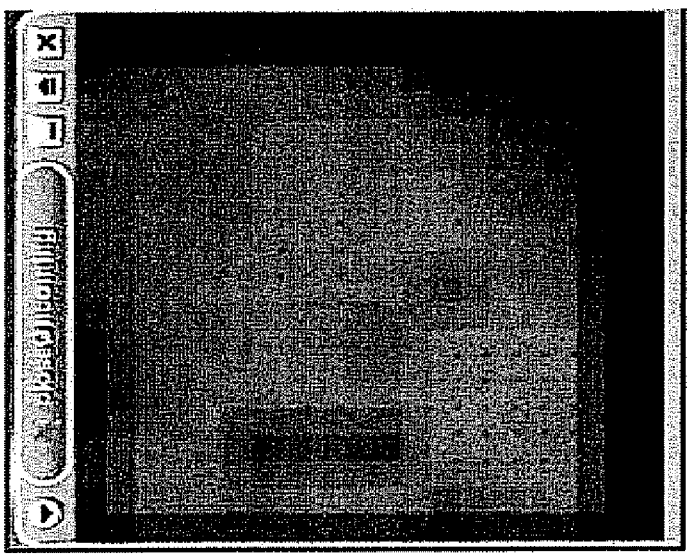
Fig. 5c ROAD SIGN
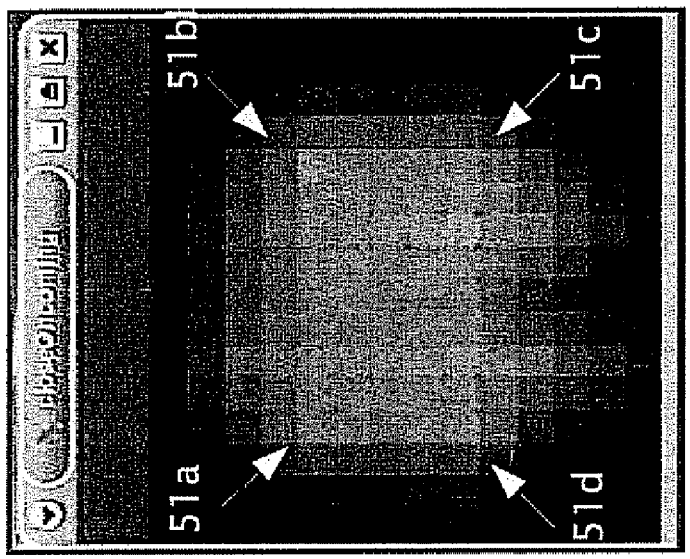
Fig 5b CLOSE HEADLIGHT
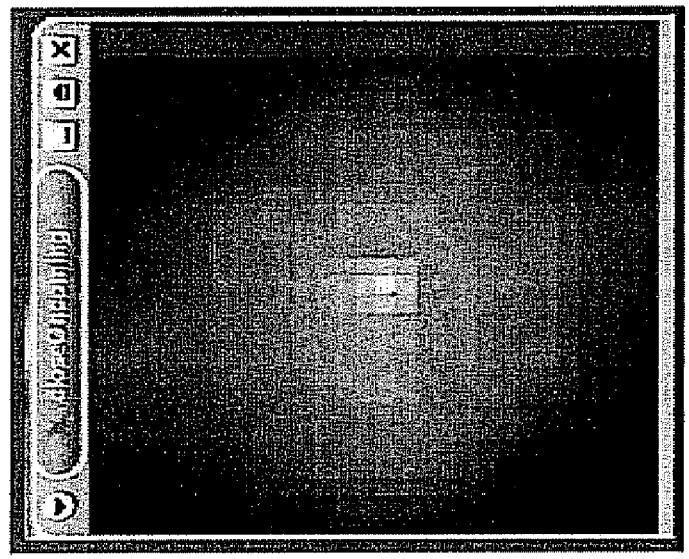
Fig 5a DISTANT HEADLIGHT
*Fig. 5*

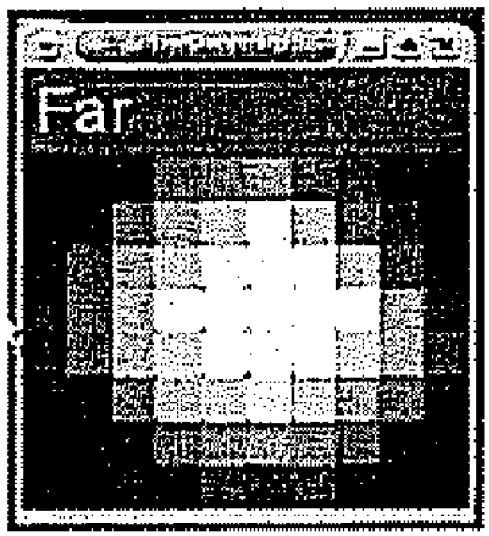
*Fig 6a*
TRAFFIC
SIGN FROM FAR
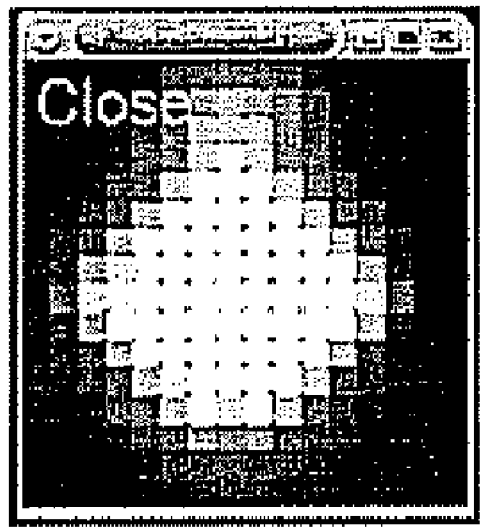
*Fig 6b*
TRAFFIC
SIGN FROM CLOSE
*Fig. 6*

HEADLIGHT, TAILLIGHT AND STREETLIGHT DETECTION

CROSS REFERENCE TO RELATED APPLICATIONS

The present application claims the benefit under 35 USC 119(e) of U.S. provisional application 60/785,351 filed on Mar. 24, 2006, and 60/836,670 filed Aug. 10, 2006, the disclosures of which are incorporated herein by reference.

FIELD AND BACKGROUND OF THE INVENTION

The present invention relates to vehicle control systems in vehicles, Specifically, the present invention detects and classifies objects in real time, e.g. oncoming vehicle headlights, leading vehicle taillights and streetlights, in a series of images obtained from a camera mounted on a vehicle, The images are used in parallel by a number of vehicle control systems including lane departure detection, forward collision control and headlight control systems. The classification of objects is preferably used by more than one of the vehicle control systems. In a headlight control system, the classification of objects is used to provide a signal for switching the headlights between high beams and low beams.

Headlight high beams are a distraction and create a safety hazard by blinding the driver of an oncoming vehicle or leading vehicle. It is not uncommon for a driver to forget to lower the high beams, thus creating a safety hazard for another driver. It is thus desirable to automatically control the state of a vehicle's headlights. Automatic vehicle headlight control also increases the use of high beams in conditions which allow their use, increasing the safety as well as reducing the hazard caused by the occasional failure of the driver to deactivate the high beams which distract the other driver.

Prior art control systems which automatically control the vehicle headlights have included a single light sensor which integrates light in the scene forward of the vehicle. When the integrated light exceeds a threshold, the vehicle headlights are dimmed.

Vehicle headlight control using cameras has also been described. In a system, as disclosed by Schofield et al. (U.S. Pat. No. 6,831,261), a headlight control device is capable of identifying characteristics of light sources is based upon an evaluation of light source characteristics in the scene forward of the vehicle. In the vicinity of each light source, each light source is separated from the remainder of the scene and analyzed to determine characteristics of the light source. One characteristic used to identify a light source is the spectral characteristic which is compared with spectral signatures of known light sources, such as those of automobile headlights and taillights. Another characteristic used in identifying a light source is the spatial layout of the light source. By providing the ability to identify the headlights of oncoming vehicles and the tail lights of leading vehicles, the state of the headlights of the controlled vehicle may be adjusted in response to the presence or absence of either of these light sources or the intensity of these light sources. In order to respond to the different characteristics of headlights and tail lights, a different exposure period is provided for the array in order to detect and identify each light source. In particular, the exposure period may be longer for detecting leading taillights and significantly shorter for detecting oncoming headlights. A solid-state light imaging array is provided that is made up of sensors arranged in a matrix on at least one semiconductor substrate. The light-imaging array includes a_spectral separation device, and each of the sensors responds to light in a particular spectral region. The control circuit responds to the sensors in order to determine if spatially adjacent regions of the field of view forward of the vehicle include light of a particular spectral signature above a particular intensity level. In this manner, the control identifies light sources that are either oncoming headlights or leading taillights by identifying such light sources according to their spectral makeup. Spatial evaluation may be implemented by selecting characteristics of an optical device provided with the imaging sensor, such as providing increased magnification central of the forward scene, or providing a wide horizontal view and narrow vertical view.

In the vehicle headlight control system, as disclosed in U.S. Pat. No. 6,831,261 special controls are required for camera settings including exposure time and magnification, for instance multiple exposures each with different exposure times.

Reference is now made to FIGS. 1 and 1a (prior art) which illustrate a vehicle control system 16 including a camera or image sensor 12 mounted in a vehicle 18 imaging a field of view in the forward direction. Image sensor 12 typically delivers images in real time and the images are captured in a time series of image frames 15. An image processor 14 is used to process image frames 15 to perform a number of prior art vehicle controls.

Exemplary Prior Art Vehicle Controls are:

Step 17-Collision Warning is disclosed in U.S. Pat. No. 7,113,867 by Stein, and included herein by reference for all purposes as if entirely set forth herein. Time to collision is determined based on information from multiple images 15 captured in real time using camera 12 mounted in vehicle 18.

Step 19-Lane Departure Warning (LDW), as disclosed in U.S. Pat. No. 6,882,287 by Scofield. If a moving vehicle has inadvertently moved out of its lane of travel based on image information from images 15 from forward looking camera 12, then system 16 signals the driver accordingly.

Step 21-Ego-motion estimation is disclosed in U.S. Pat. No. 6,704,621 by Stein and included herein by reference for all purposes as if entirely set forth herein, Image information is received from images 15 recorded as the vehicle moves along a roadway. The image information is processed to generate an ego-motion estimate of the vehicle, including the translation of the vehicle in the forward direction and the rotation. Vehicle control systems, such as disclosed in U.S. Pat. No. 6,831,261 which rely on changing exposure parameters (ie, aperture, exposure, magnification, etc) in order to detect headlights have a difficult time maintaining other control systems which rely on the same camera, e.g. Lane Departure Warning, Forward Collision Warning, etc. As a result of changing exposure parameters half or more of the (possibly critical) frames may not be available for the other control systems. This greatly affects performance of the other control systems.

Hence, since in the vehicle headlight control system as disclosed in U.S. Pat. No. 6,831,261 (or in any other disclosure where special control is required of camera settings including, aperture, exposure time and magnification), the same camera cannot be conveniently used for other simultaneously operable vehicle control systems such as LDW 19 or collision warning 17.

Additionally, the use of color cameras with infrared filters required to achieve good spectral separation reduces imaging sensitivity by a factor of six or more. A reduction in sensitivity by such a factor has an adverse impact on other vehicle control application such as LDW performance in dark scenes.

The presence of an infrared filter also negates the use of the camera as a near infrared sensor for applications, such as pedestrian detection. Thus, headlight control systems which make strong use of color or spectral analysis in the captured images (such as in U.S. Pat. No. 6,831,261) will tend not be compatible with other applications without sacrificing performance.

There is thus a need for, and it would be highly advantageous to have a method of detecting and classifying objects in real time, e.g. oncoming vehicle headlights, leading vehicle taillights and streetlights, in a series of image frames 15 obtained from a camera mounted in a vehicle to provide a signal, specifically with image frames 15 available for use by a number of vehicle control applications.

The term "classification" as used herein refers to classifying the object of which a spot in an image frame is the image of a real object, e.g. headlight, tail lights. The term "classification" is used to refer interchangeably to the spot or to the object.

Radial basis functions (RBF) are used for interpolation in a stream of data. Radial basis functions (RBF) differ from statistical approaches in that approximations must be performed on streams of data rather than on complete data sets. RBFs use supervised learning and sometimes unsupervised learning to minimize approximation error in a stream of data. They are used in function approximation, time series prediction, and control. http://en.wikipedia.org/wiki/Radial_basis_function The terms referring to image space such as "downward", "inward" "upward", "upper", "lower", "bottom and "top" refer to a non-inverted image as viewed on a monitor from camera 12.

SUMMARY OF THE INVENTION

According to the present invention there is provided a method in a computerized system including an image sensor mounted in a moving vehicle. The image sensor captures image frames consecutively in real time. In one of the image frames, a spot is detected of measurable brightness; the spot is matched in subsequent image frames. The spot and the corresponding spot are images of the same object. The object is typically one or more of headlights from an oncoming vehicle, taillights of a leading vehicle, streetlights, street signs and/or traffic signs. Data is acquired from the spot and from the corresponding spot. By processing the data, the object (or spot) is classified producing an object classification. Substantially all the image frames are available to the computerized vehicle control system and at least one other vehicle control system. The vehicle control system controls preferably headlights of the moving vehicle based on the object classification. The other vehicle control system using the image frames is one or more of: lane departure warning system, collision warning system and/or ego-motion estimation system. The object classification is typically provided to and used by one or more of the other vehicle control systems. The data typically relates to a property of the spot and the corresponding spot, such as position in the image frame, shape, brightness, motion, color and spatial alignment. The motion of the spot is tracked (in image space) by comparing respective image frame positions of the spot and the corresponding spot. Spots can be classified using radial basis functions. The spots are classified as headlights, taillights, street lights, or road signs. Street lights are preferably classified using spatial alignment. Preferably, classification is performed using texture and/or edge characteristics of the spots. For each of the spots, the classification uses the data from an area centered on each spot including N×N picture elements of the image frame, wherein N is an integer preferably less than twenty.

Typically, the object is not classified as a street sign when the motion is outward and upward. High beams are deactivated upon classifying the object as being a part of a vehicle such as a passing vehicle, a preceding vehicle or an oncoming vehicle. The high beams are reactivated based on the tracking motion. Preferably, the data is related to a shape of the spot, wherein the shape is indicative of the spot splitting into spots in one or more subsequent image frames. A second spot of measurable brightness is preferably detected in the first image frame; and motion is tracked of the spot and the second spot between the first image frames and one or more subsequent image frames. The first and second spots are paired based on comparing the motion of the first spot to motion of the second spot. The object is classified as a taillight when the motion of the first and second spot is inward. Compensation of the motion, e.g. yaw and/or pitch of the vehicle is preferable prior to classification based on motion of the first and second spots.

According to the present invention there is provided a method for controlling headlights of the vehicle in a computerized system including an image sensor mounted on a moving vehicle. The image sensor captures in real time an image frame. In the image frame are detected spots of measurable brightness, the spots being respective images of objects. Data is acquired from the spots and the data is processed. The objects are classified based on the data and the classification is performed by previously training with known images. The known images include images from objects such as taillights, oncoming lights streetlights, and traffic signs. The image sensor preferably includes a filter. The filter has spatial profile, e g checkerboard profile, including portion which preferentially transmit red light. The spots of the image are correlated with the spatial profile for classifying the spots. Upon classifying the objects as taillights of a leading vehicle, distance is determined to the leading vehicle and the headlights of the moving vehicle are preferably adaptively controlled based on the distance. Upon classifying the objects as three streetlights along a road. The curvature of road is determined and adaptively controlling headlights of the moving vehicle are adaptively controlled based on the curvature. The detection includes detecting includes determining a quadrant of the spots within the image flame. Only one headlight of the moving vehicle based is preferably controlled based on the quadrant. The training and the classification are preferably performed using radial basis functions. The classification preferably uses pairs of the spots to identify vehicle taillights. The classification preferably includes spatial alignment of spots to detect streetlights. Preferably classification is performed using texture and/or edge characteristics of the spots. For each of the spots, the classification uses the data from an area centered around each spot including N by N picture elements of the image frame, wherein N is an integer less than twenty.

According to the present invention there is provided a method for controlling headlights of the vehicle in a computerized system including an image sensor mounted on a moving vehicle. The image sensor captures in real time an image frame. In the image frame are detected spots of measurable brightness, the spots being respective images of objects. Corresponding spots are matched in subsequent image frames. The corresponding spots are respective images of the objects. Data is acquired from the spots and from the corresponding spots. The data is processed and the objects are classified based on the data. The classification is preferably performed based on previous training with known images. Motion of the spots is tracked by comparing respective image frame positions of the spots and the corresponding spots. High beams are deactivated upon classifying the objects as being a part of a vehicle such as passing vehicle, a preceding vehicle and or an oncoming vehicle, and high beams are reactivated based on the tracking motion.

According to the present invention there is provided a system which performs vehicle headlight control according to the methods as disclosed herein.

BRIEF DESCRIPTION OF THE DRAWINGS

The invention is herein described, by way of example only, with reference to the accompanying drawings, wherein:

FIG. 1 is a prior art drawing of a conventional vehicle with a mounted camera for vehicle control systems;

FIG. 1a is a drawing illustrating multiple prior art vehicle control outputs using a single hardware camera and hardware;

FIG. 2 is a drawing according to an embodiment of the present invention of a vehicle control system using the same camera and hardware as in FIG. 1a;

FIG. 5 illustrates texture and edge characteristics of spots of different objects, according to embodiments of the present invention;

FIG. 6 illustrates images of a diamond shaped traffic sign, according to embodiments of the present invention;

DESCRIPTION OF THE PREFERRED EMBODIMENTS

Figure 2A:
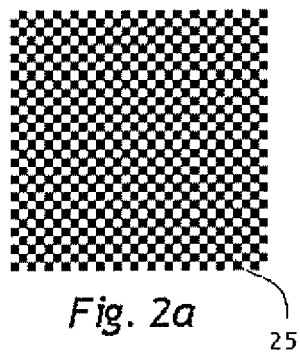
FIG. 2a is a drawing of a red/clear filter used in accordance with are embodiment of the present invention.

The present invention is of a system and method for detecting and classifying objects in real time, e.g. oncoming vehicle headlights, leading vehicle taillights and streetlights, in a series of image frames 15 obtained from a camera mounted on an automobile to provide a signal for switching the headlights between high beams and low beams, specifically with image frames 15 available for use by other vehicle control applications The principles and operation of a system and method of detecting and classifying objects in real time, in a series of images obtained from a camera mounted on an automobile to provide a signal for switching the headlights between high beams and low beams, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide a method of vehicle headlight control which does not place constraints on the image sensor in use nor requires control of the exposure parameters. It is clearly an advantage to be able to use the same image sensor that is used for other vehicle control applications such as lane departure warning and forward collision warning. Bundling up multiple vehicle control applications (e.g. collision warning (step 17), Lane departure warning (step 19) and Ego-motion estimation (step 21) with the same hardware (system 16) reduces cost and more importantly saves space. Since the vehicle control systems are typically mounted on the windshield near the rear view mirror they must be small so as not to block the drivers' view of road. It is not enough to share the imager hardware, e.g. camera 12 between the different vehicle control applications. It is important to share image frames 15 themselves. In other words, images captured with one gain and exposure setting are preferably used for both headlight control and the additional applications, (e.g. steps 17,19, 21). The strength of the methods, according to embodiments of the present invention is in the image processing algorithms used rather than a particular image sensor 12 configuration. These algorithms first detect bright spots in the image and then track these spots over multiple frames and accumulate statistics of shape, motion, brightness spatial alignment and possibly color when available. Based on these statistics the spots are classified as coming from oncoming vehicle headlights, preceding vehicle taillights and streetlights or other light sources.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Figure 2:
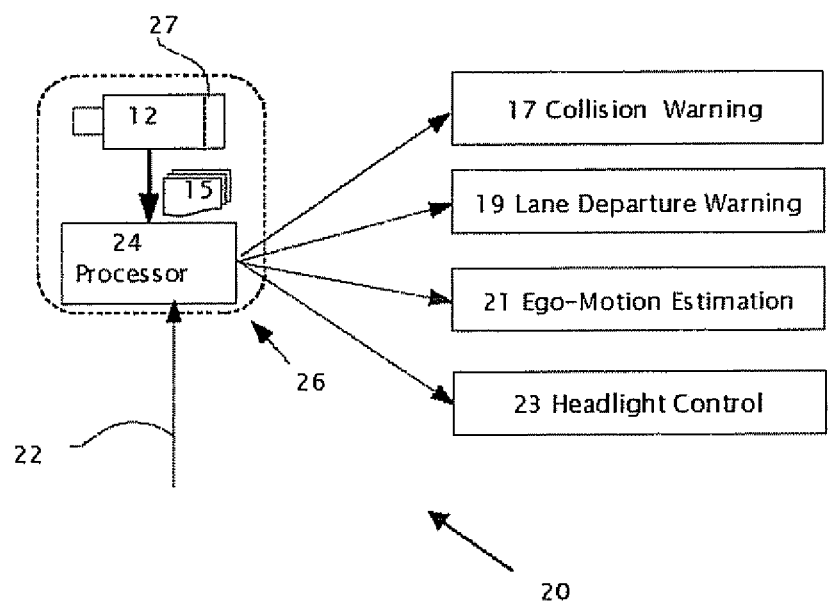

Referring now to the drawings, FIG. 2 schematically illustrates a system 20 according to embodiments of the present invention. Image frames 15 are captured from image sensor or camera 12. Methods according to different embodiments of the present invention analyze using an image processor 24 in real time one or more of shape, position and motion of spots of measurable brightness in image frames 15. Typically inputs 22 are received from vehicle 18 such as speed, and current headlight status. A signal (step 23) is provided to the headlight control unit of vehicle 18 to switch between high beam and low beam. It is possible to determine which spots of measurable intensity if any, come from oncoming vehicles, preceding vehicles (i.e. taillights) or streetlights and which come from other objects such as traffic signs reflections, distant buildings, etc. In the presence of oncoming vehicles or preceding vehicles, the system may signal (step 23) for the headlights to be dimmed. The basic concept is to detect bright spots in the image and track the spots over time collecting information about the spots regarding their shape, brightness, motion, spatial alignment and possibly color. When the algorithm has accumulated enough evidence then the spot is tagged as being in one of the relevant categories and the headlights are controlled appropriately (step 23). An advantage of the method as disclosed herein is that requirements on camera control are minimal, thus allowing for the same camera 12 to be simultaneously used for other applications such as lane departure warning (LDW) or forward collision warning.

Embodiments of the present invention use a forward looking image sensor 12 such as a CMOS sensor mounted on a vehicle 18. Sensor 12 is connected to an image processing unit 24 which is a general purpose microprocessor, a processor implemented using digital signal processing (DSP) or an application specific integrated circuit (ASIC) or a combination of the different technologies.

High dynamic range images 15 are preferred to avoid saturation of spots, for example, so that a bright spot imaged from a headlight of an oncoming vehicle may be distinguished from a less bright reflection from a traffic sign. Ideally, image sensor 12 has a high dynamic range with a linear response corresponding to more than 8 bits or by having a nonlinear, e.g. logarithmic response, to light intensity. Image sensor 12 is preferably, but not limited to, a standard monochrome or color camera in different embodiments of the present invention. Reference is now made to FIG. 2a, which illustrates a red/clear filter 25 used in accordance with embodiments of the present invention. Red/clear filter 25 is a "checkerboard" filter in which the dark squares of the checkerboard preferentially transmit red light and the other squares are comparatively clear and transmit white light. The choice of a "checkerboard" is by way of example only and other shapes or geometric lattices may be similarly be used, such as stripes of red and clear. Red/clear filter 25 is installed at a focal plane 27 of image sensor 12 so that an imaged spot from an object, e.g. headlights of an oncoming vehicle, streetlights, taillights of a leading vehicle, falls on multiple pixels both with and without red filtering of red/clear filter 25. The imaged spot is correlated with the profile, e.g checkerboard of red/clear filter 25. A spot, such as an image of oncoming "headlight" will have a high correlation with the checkerboard profile and a red light such as a taillight of a leading vehicle will have a comparatively poor correlation with the checkerboard profile of filter 25. Thus, the correlation with the filter profile is preferably used to distinguish between red and white lights and for classifying the lights.

In well lit road scenes, headlights are always set (step 23) to low beam. However, at night with a dark road scene, headlight control sets (step 23) to high beam or low beam depending on the presence oncoming and/or preceding vehicles or streetlights. Once a taillight of a leading vehicle is detected, the distance from vehicle 18 may also be determined. Determining distance multiple image frames under scale change is disclosed in co-pending application entitled: "Estimating distance to an object using a sequence of images recorded by a monocular camera", with priority from U.S. provisional application 60/755,778. The headlamps may be adaptively controlled to high, medium, low or very low settings, based on technologies which allow for "adaptive headlight control". The paper Adaptive Light Control—A New Light Concept Controlled by Vehicle Dynamics and Navigation," by J. P. Lowenau, J. H. Bernasch, H. G. Rieker, P. J. Th. Venhovens, J. P. Huber, and W. Huhn, SAE Paper No. 980007, pp. 33-38 is included herein by reference for all purposes as if entirely set forth herein.

Similarly, once three or more streetlights are classified, according to embodiments of the present invention, techniques of adaptive light control can be used to determine the road curvature and send signal to aim the headlights using horizontal adaptive light controls in a particular direction.

Figure 3:
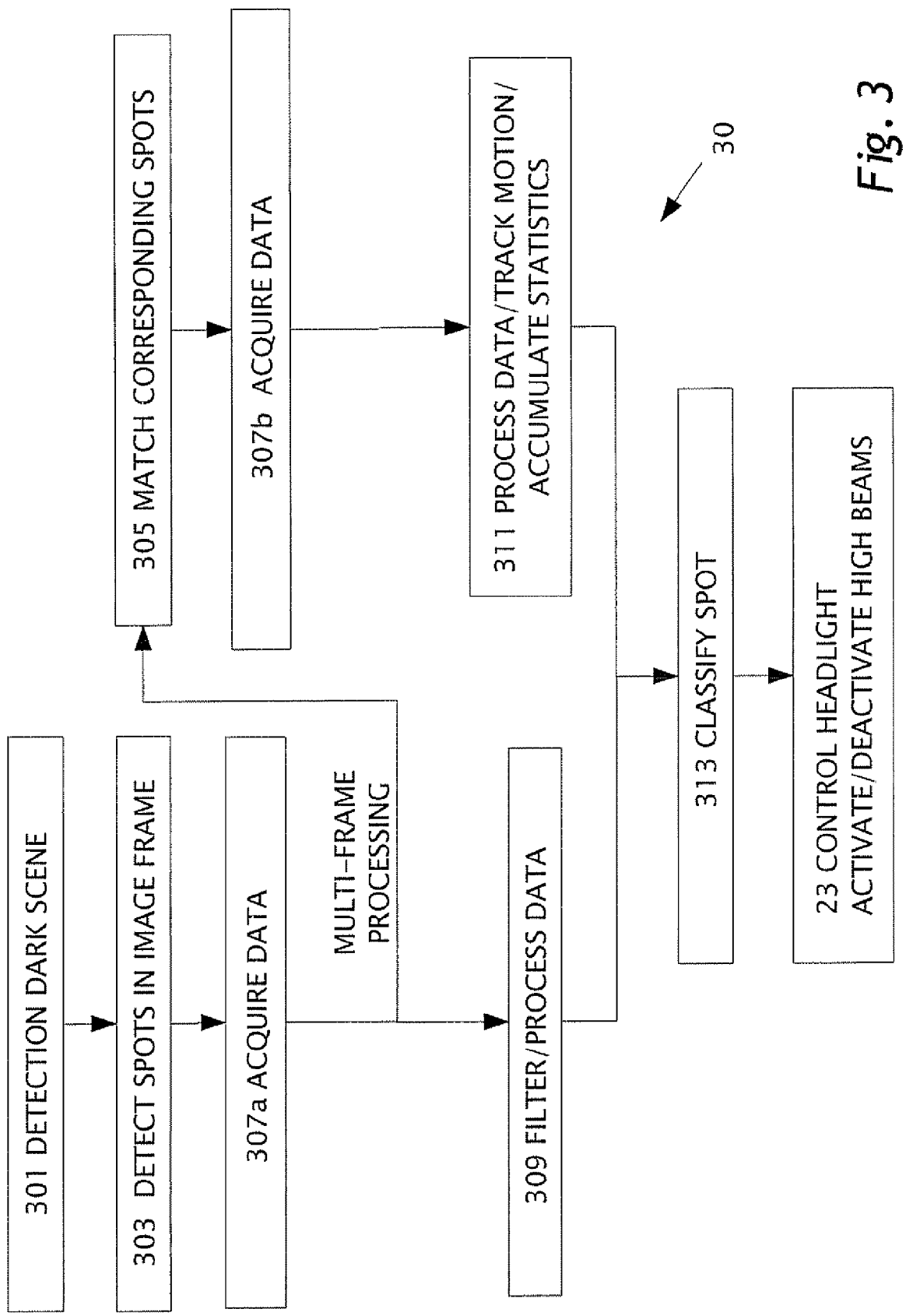
FIG. 3 is a flow diagram, according to embodiments of the present invention.

Reference is also now made to FIG. 3, a flow diagram of a method 30 according to embodiments of the present invention. In method 30, when a dark scene is detected (step 301), e.g. at night without sufficient lighting method 30 is used to control headlights (step 23). Otherwise, the scene is "lit" and the headlights are switched to a low beam state. In the dark scene, spots of measurably brightness are detected (step 303) in image frames 15. Data is acquired (step 307a) regarding the detected spots, typically including position, intensity, size, shape, color (if image sensor 12 is color sensitive). Data of interest may also include edge detection and texture (intensity profile) of the spot. Typically, according to embodiments of the present invention, both single frame processing (step 309) and multiple frame processing (step 311) is performed to improve the confidence of the classification (step 313). When multiple frame processing (step 311) is performed, processing (step 311) includes both tracking motion of the corresponding spots among image frame 15 and accumulating statistics. In the following description, method steps of method 30 are discussed in further detail.

Step 301: Dark Scene Detection

A lit scene can be detected by measuring the ambient light. One method useful for detecting the brightness, simply counts the number of pixels in image frames 15 that are above a previously defined brightness threshold. If the number of pixels above the threshold is larger than a previously defined threshold number, the scene is classified as bright and the headlight beams are switched (step 23) to low.

Another method for lit scene/dark scene detection is to tessellate one or more image frames 15 into patches and classify the ambient light based on histograms of pixel values in each patch. In one implementation, the subsampled 160× 120 size image was tessellated into 5×5 rectangles of 32×24 pixels each. A 16 bin histogram was created for each bin, Thus, 5×5×16=400 values were created for each image. A classifier was then trained on example images of dark and lit scenes. Neural networks and homogeneous kernel classifiers were both used and gave good results. The second method also works well for nearby cars (typically a distance under 20 m) which are lit by headlights of vehicle 18.

Step 303: Detection of Spots in Image Frame

In dark scenes, the only features detectable with measurable brightness in image frames 15 are spots imaged from lights in the road scene. Three types of lights are of special interest: headlights of oncoming vehicles, taillights of preceding vehicles and streetlights. Thus, detection of vehicles in the road scene is based on detection (step 303) of spots in image frames 15 by verifying that the spots in fact are images of one of the tree types of lights of special interest: Other spots in image frames 15, not of special interest, that is not imaged from vehicles or streetlights include: reflections from railings, lights on buildings in the distance, bus stops, "neon" signs and lit traffic signs on highways. Different features distinguish between the spots of special interest and the other spots. Each feature is used to determine a score and the scores are combined together for classification of the objects imaged by the spots.

Oncoming vehicles headlights are typically very bright. A threshold can be determined such that if a spot has enough pixels above the threshold, the spot is with high confidence an image of a headlight of an oncoming vehicle and the possibility is very low that the bright spot is a reflection from a traffic sign. When oncoming vehicles are more distant or not exactly in line with vehicle 18, the imaged spots of headlights are less bright and will less likely be detected as being above the threshold.

Figure 4:
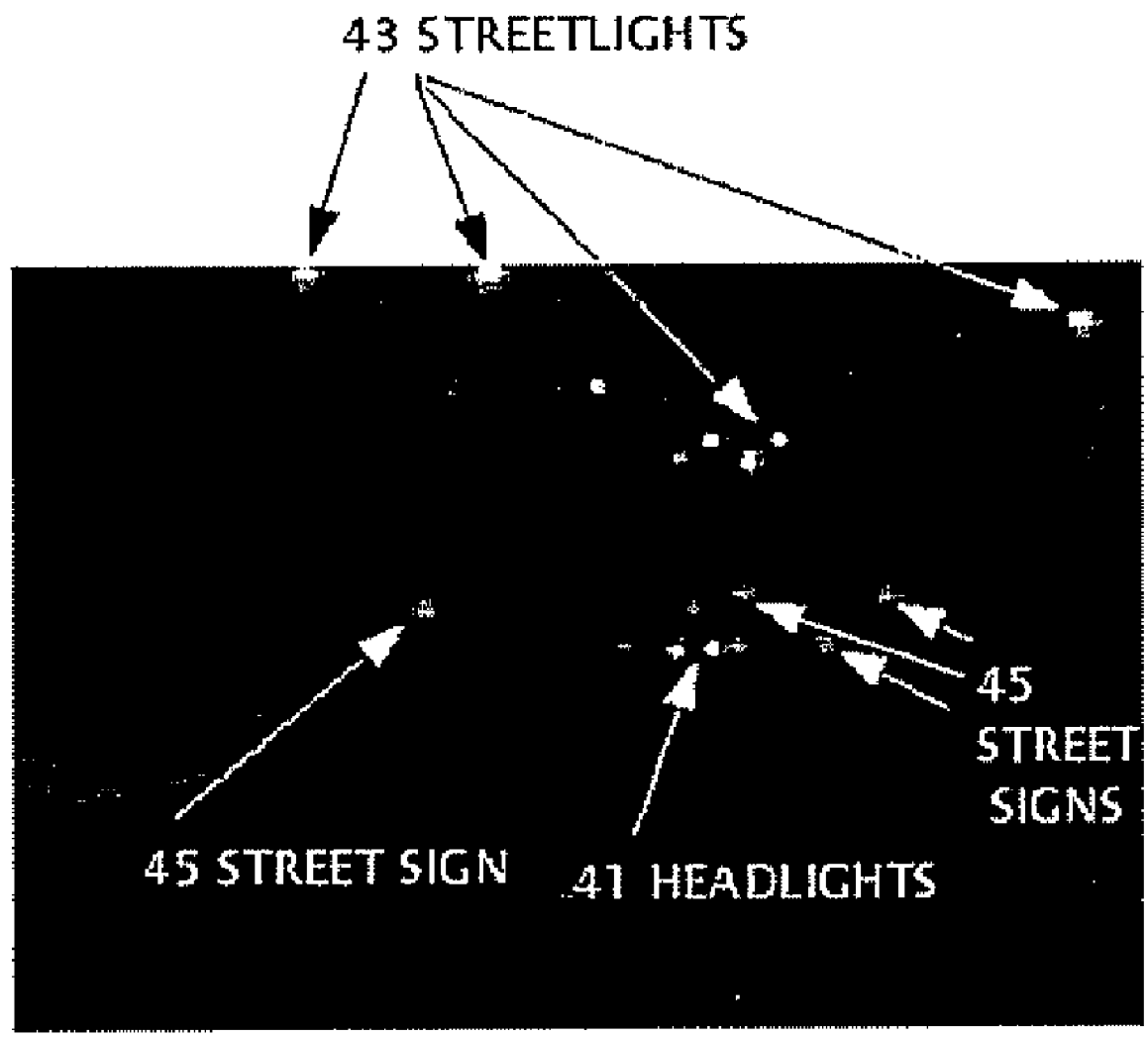
FIG. 4 is a photograph of a dark road scene, according to embodiments of the present invention.

FIG. 4 shows a typical dark road scene (image frame 15) captured using camera 12 of high dynamic range. Lights sources as well as reflections from distant traffic signs are shown. Using high dynamic range camera 12, spots imaged of different light sources, spots 41 of headlights and spots 43 of streetlights may be differentiated from street signs 45 based on the brightness of the spots. Spots 45 of imaged street signs at close range may also appear very bright however, other information such as information from shape and motion may be used to differentiate images 45 of street signs from images 41 of headlights 30.

Step 313 Spot Classifier

A spot imaged from a light source, for example a spot 43 as image of a streetlight appears different or has a different texture than a spot 45 as image of a reflection of a traffic sign. The spot from a light source typically has fuzzy edges and a bright center (almost Gaussian in cross section). Spot 45 image of a traffic sign at medium distance has typically sharper edges and uniform appearance inside. A classifier trained on examples of light sources and traffic signs can produce correct classification rates with confidence above 85%. Spot classification when combined with other features of according to embodiments of the present invention improves classification to close to 100% correct.

According to an embodiment of the present invention there is provided a method for detecting from which side of vehicle 18 is the object, e.g. headlights from the right or left. The detector of image sensor 12 is preferably divided into four quadrants. By determining in which quadrant is the image spot of the object e.g. a light of the approaching or leading vehicle, a signal can be generated to control for instance an individual headlamp.

Texture Based Filtering

Reference is now made to FIGS. 5a-c, In FIG. 5a, spots formed by oncoming headlights from a relatively long distance, e.g. 100 meters have a texture which is approximately radially symmetric with a bright point in the center. FIG. 5b illustrates the texture of a headlights at a close distance, e.g. 20-50 meters and appears as four clusters 51. Two upper clusters 51a and 51b are the actual headlights. The two lower clusters are reflections of the headlights from the road surface. FIG. 5c illustrates a spot imaged of a road sign which typically includes asymmetric clusters. Large traffic signs can appear very bright in the image. However, it is clear from the spot in FIG. 5c that the brightness is not uniform. According to a feature of the present invention the pixels are grouped into patches of intensity, with a threshold e.g. within 95% of a maximum for each patch. The position, size and shape of each cluster are computed. Oncoming lights or close taillights might also appear as one large non-uniform blob. However, the lights of cars have symmetry to them. Oncoming lights have typical configurations such as:

A single bright spot as illustrates in FIG. 5a.

Two bright spots at equal image height.

Three bright spots with the middle one higher than the other two.

Four bright spots arranged as two above two, where the lower two are either due to fog lights or more typically, reflections of the headlights from the road surface as illustrated in FIG. 5b. According to a feature of the present invention, a score is computed regarding structure (or texture) based on the number of clusters and their position. Alternatively, a classifier can be trained on image moments of the cluster using moments up to the 6th moment.

Edge Based Sign Filter

Figure 7:
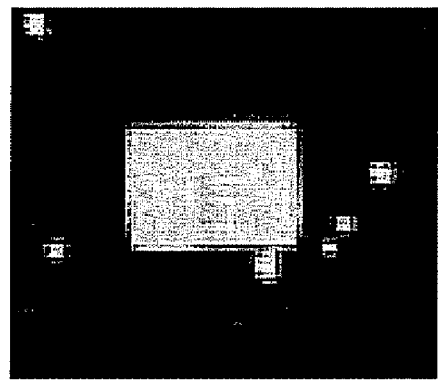
FIG. 7 illustrates vertical edge of image of traffic sign, according to embodiments of the present invention.

According to another feature of the present invention, spots are classified according to the edge of the spots. Reference is now made to FIGS. 6a and 6b of spots in image frames 15 of a diamond shaped street sign. As illustrated in FIG. 6a, traffic signs fifty to one hundred meters distant, appear quite bright due to light from the vehicle headlights reflecting from the highly reflective sign, and may be incorrectly classified as lights based on brightness alone. However, with sufficient image resolution, traffic signs typically have at least one sharp edge. For each patch (e.g. white surrounded by black) in the spot, a nonlinear function is computed of image gradients inside the patch (e.g. $dx^2+dy^2$), the ratio is computed of the number of pixels above a threshold to the size of the patch. If the ratio is above a threshold, the classification of the spot is delayed until after further images frames 15 are processed (step 311). For closer signs (above 20 pixels is height), we look for extended vertical edges as in FIG. 7 and compute the ratio between the length of the longest vertical edge and the sign height. The same can be done for horizontal edges but only for stationary spots. If there is lateral motion, or yaw, the motion blur causes a horizontal edge in the image. Host vehicle yaw and pitch can be determined from image frames 15 using techniques including those disclosed in co-pending application of the present assignee entitled: "Estimating distance to an object using a sequence of images recorded by a monocular camera", U.S. provisional application 60/755,778 included herein by reference for all purposes as if entirely set forth herein.

Streetlight Structure

Figure 8:
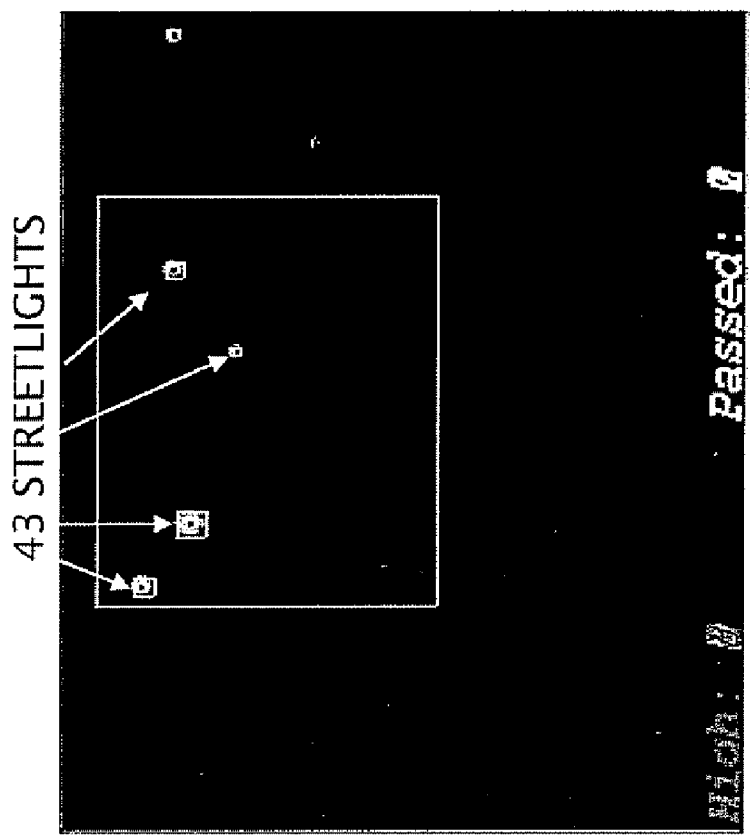
FIG. 8 illustrates alignment of images of streetlights, according to embodiments of the present invention.

Three or more spots that are located above the horizon and are along a line passing close to the vanishing point of the road, indicate a streetlight structure. Two pairs of two lights, one on each side of the image are also classified as streetlights 43, as illustrated in FIG. 8.

Taillight RBF Classifier

According to a feature of the present invention, taillight detection is based on spot pairs. If two spots of light are detected (step 303) and after data acquisition step 307a are found to have similar size, moderate brightness and similar vertical position, the spots are assumed initially to be vehicle taillights. A classifier is trained uses a patch, e.g. 9 by 9 pixels of raw image data centered around the center of the spot. A radial basis function (RBF) classifier is preferable and typically ~92% confidence level is found. Other classifiers are expected to operate similarly.

(Step 311) Multi-Frame Processing

According to different features of the present invention, several multi-frame processing techniques are available. Data is acquired (steps 307a 307b) and statistics of the data may be calculated. For instance scores are averaged over several image frames 15. In addition spot motion is computed. For instance, spots that move up and outward are of traffic signs 45 and not of vehicle lights, e.g. headlights 41.

According to the aforementioned feature of the present invention, taillight detection is based on spot pairs. If two spots of light are detected (step 303) and after data acquisition step 307) are found to have similar size, moderate brightness and similar vertical position, the spots are assumed initially to be vehicle taillights. If the spots are far apart, then to continue with the classification of taillights the spots are required to be brighter, since they must come from a close, e.g. 10-20 meters, preceding vehicle. After tracking (step 311), specific constraints on the spot motions are required to continue with the classification of taillights. If fast lateral motion of one spot in the pair is detected (step 311) the taillight classification is removed. Distance between spots under scale change with distance from vehicle 18 is limited to be between specific values. Distance between spots under scale change with distance is disclosed in co-pending application entitled: "Estimating distance to an object using a sequence of images recorded by a monocular camera", with priority from U.S. provisional application 60/755,778.

Taillight Passing Score

According to another feature of the present invention, spots at the sides of image 15 that have inward motion are typically from vehicles traveling faster and passing host vehicle 18. Upon detecting the inward motion, these spots are immediately tagged as taillights. The passing score is an accurate way to tag passing cars and motorcycles and quickly lower (step 23) host vehicle 18 headlights. Tagging based on taillight passing is optionally made more robust upon compensation for lateral motion or yaw of host vehicle 18 by processing of images 15 or with an external inertial sensor.

Light Control Policy

The basic light control policy is that headlights are lowered when any oncoming headlights, preceding taillights are detected or more than N streetlights are detected. The number of required streetlights can be defined for each country or car manufacturer. When all the above conditions cease to exist the high beams are switched on after a grace period. The exact length of the grace period can depend on various parameters. For example, if oncoming headlights are tracked (step 311) to the edge of image frame 15, high beams can be switched on (step 23) immediately as they disappear. However, if oncoming headlights disappear while still in the center of image frame 15, a grace period of a few seconds is allowed to account for a momentary obstruction and to avoid unwanted flickering of the lights.

Algorithm Flow

One possible implementation of the present invention uses a data structure which is a list of spots. Each spot includes the following data, where:

(integer) ID.
(image coordinate) Last XY.
(image coordinate array) motion history.
(integer array) shape score history.
(integer array) brightness score history.
(integer) Type: oncoming, taillight, streetlight, untagged.
(integer) Age.
(integer) Approval delay.

A spot typically starts off as type: untagged. During the "lifetime" of the spot, the spot may be tagged as oncoming, taillight or streetlight. Once a spot is tagged as oncoming or taillight, the spot keeps the tag until the spot is "killed" or re-evaluated and tagged with a different type. For instance, a spot tagged as a streetlight might be reevaluated and tagged as oncoming.

Since taillights of cars often appear in the image as two spots it is also useful to have a data structure to hold possible pairings. Each pair includes the following information:

(pointer to spot) spot1.
(pointer to spot) spot2.
(int array) pair scores history.
(image coordinate array) pair motion history.
(int) Age.
(int) pair Not Found Grace.
(int) one Light Not Found Grace.

According to embodiments of the present invention, the following algorithm uses the above data structures to analyze an image and detect oncoming headlights, preceding taillights and streetlights.

Detect Spots in New Image:
(a) Find local maxima in the image with value above a threshold,
(b) Extend the spot laterally in image space, until the region drops to 90% of the local maxima and determine size and shape of the spot
(c) Merge spots that overlap,
(d) Compute zeroth, first and second moments of each spot (i.e. size, position and orientation and eccentricity of approximating ellipse).
(e) Compute average brightness and variance of each spot.
(f) Match old spots to new image spots:
  i. Predict location of old spots based on previous motion.
  ii. Find closest spot (given predicted motion) with most similar size and brightness.

The score S for matching old spots to new spots may be determined using:

$$S=\alpha(x_t-x_{t-1})^2+\beta(y_t-y_{t-1})^2+\gamma(b_t-b_{t-1})^2+\delta(s_t-s_{t-1})^2 \quad (1)$$

where $(x_t, y_t)$, $(x_{t-1}, y_{t-1})$ are the spot centroid positions at time t and position predicted from time t−1 respectively. b and s represent the brightness and size values respectively. S is the resulting score.

iii. Both position and size must be within given respective thresholds.
  iv. If the shape of the spot in the previous image is indicative of two headlights close together, splits are allowed of the one spot to two spots. For example the shape of the spot might be elongated above a certain threshold or the contour is non convex. This often occurs with oncoming vehicles. If two new spots both give high scores and neither is matched to another old spot then old spot is matched to both new spots.
  v. A spot that is not matched (step 305) is kept alive for N frames 15.
(g) Match (step 305) old spot pairs to two new image spots:
  i. For each pair search for best possible two spots.
  ii. If no pair found find best single spot match within threshold and assume other spot has not moved relatively but is obscured. Keep alive for a number of frames.
  iii. If neither spot is matched (step 305), keep alive for N frames with same motion.
(h) For matched spots add new spot data to old data structure. For unmatched new spots create new data structures.
(i) Unmatched old spots that have not been detected for the past N frames are killed (i.e. removed from the list).

Classification (step 313) as Oncoming:
(a) Test untagged spots below a certain row in the image using oncoming classifier path:
  i. If spot has N pixels has above threshold T then tag spot as oncoming.
  ii. Compute spot classifier score.
  iii. Compute structure symmetry score.
  iv. Compute vertical edge score.
  v. Compute edge score—if large edge ratio is detected increase 'approval delay' value for spot by N.
  vi. Test for approval as oncoming:
    A. If spot age is greater than 10+ approval delay then if all scores from last 10 frames are greater than T1 then tag spot as oncoming.

B. If spot age is greater than 20+ approval delay then if all scores from last 20 frames are greater than T2 then tag spot as oncoming.
C. If spot age is greater than 40+ approval delay then if all scores from last 40 frames are greater than T3 then tag spot as oncoming.
D. If spot age is greater than 80+ approval delay then if all scores from last 80 frames are greater than T4 then tag spot as oncoming.

where T1>T2>T3>T4.

Classification (Step 313) as Streetlights or Taillights
(b) Test untagged spots above a certain row in the image for approval as streetlights:
  i. Compute spot classifier score
  ii. Discard spots whose score is below a threshold.
  iii. If three or more spots form a line passing near the vanishing point of the road tag all these spots as streetlights.
  iv. If two pairs of such spots form two lines intersecting near the vanishing point of the road then tag four spots all as streetlights.
(c) Classify untagged spots and pairs with tail light classifier:
  i. Test for inward motion (passing score). If passing then tag as taillight.
  ii. Compute taillight RBF score: if last 10 scores are above a threshold T1 then tag as taillights.
  iii. If spot is part of a pair and pair age is greater than N and both spots are visible this frame and both spots have taillight RBF score above a threshold T2 then tag as taillights.

Light Control Policy
(a) If oncoming spots exist and they are all leaving the scene set a grace counter to a small value (nearly zero). If oncoming spots exist and at least one is not leaving the scene set the grace counter to a larger value. If not oncoming spots exist, decrement the grace counter.
(b) If taillight spots exist set a grace counter to a given value. If not taillight spots exist, decrement the taillights grace counter.
(c) If streetlight spots exist set a grace counter to a given value. If not streetlight spots exist, decrement the streetlights grace counter.
(d) If any grace counter is greater than zero do not switch on high beams.

Figure 9:
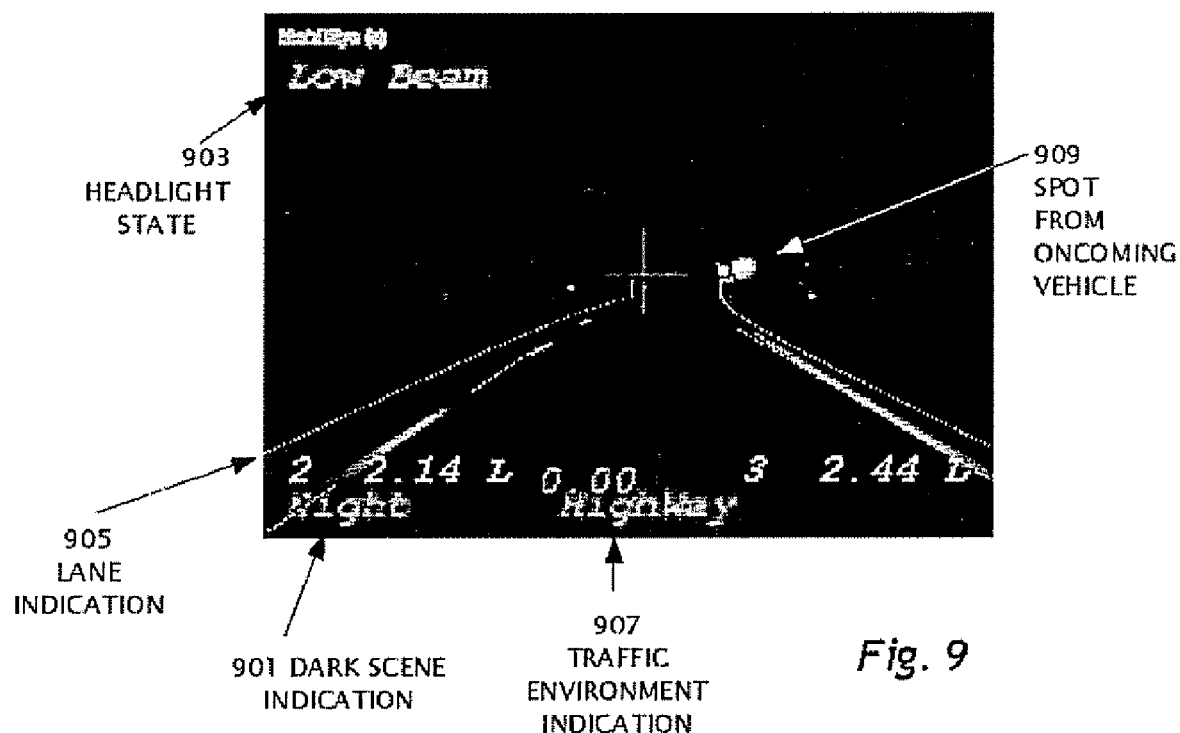
FIG. 9 illustrates a monitor output of a lane departure warning system and a vehicle control system, according to embodiments of the present invention.

Reference is now made to FIG. 9 which illustrates a monitor output of system 26, according to embodiments of the present invention. A spot is classified (step 313) as being from headlights of an oncoming vehicle causing headlights to switch (step 23) to low beam. Indication of low beam is shown in FIG. 9 as headlight state 903. Dark scene indication 901 is also shown as output of vehicle headlight control system 26. A simultaneously operating lane departure system using image frames 15 provides an indication 905 of lanes and an indication 907 of recognizing a highway scene.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. In a computerized vehicle control system including an image sensor mounted on a moving vehicle, wherein the image sensor captures consecutively in real time a plurality of image frames, a method comprising the steps of:
  (a) in at least one of the image frames, detecting a spot of measurable brightness;
  (b) matching in at least one subsequent image frame of the image frames, a corresponding spot, wherein said spot and said corresponding spot are images of a light source;
  (c) acquiring data respectively from said spot and from said corresponding spot,
  wherein said data includes at least one of position characteristics, intensity characteristics, size characteristics, and shape characteristics, but not color characteristics, of said light source; and
  (d) processing said data, thereby classifying the light source based on said data, and producing a light source classification, wherein substantially all the image frames are available to the computerized vehicle control system and at least one other vehicle control system;
  wherein the vehicle control system controls headlights of the moving vehicle based on said light source classification and said at least one other vehicle control system is selected from the group consisting of a lane departure warning system, a collision warning system, and an ego-motion estimation system.

2. The method according to claim 1, wherein said light source is selected from the group consisting of: headlights from an oncoming vehicle, taillights of a leading vehicle, streetlights, street signs and traffic signs.

3. The method according to claim 1, wherein said light source classification is provided to and used by said at least one other vehicle control system.

4. The method according to claim 1, further comprising the step of:
  (e) tracking motion of said spot by comparing respective image frame positions of said spot and said corresponding spot.

5. The method according to claim 4, said classifying said light source not as a street sign when said motion is outward and upward.

6. The method according to claim 4, further comprising the steps of:
  (f) deactivating high beams upon said classifying said light source as being a portion of a vehicle selected from the group consisting of a passing vehicle, a preceding vehicle and an oncoming vehicle; and
  (g) reactivating high beams based on said tracking motion.

7. The method according to claim 1, wherein said data is related to a shape of said spot, wherein said shape is indicative of said spot splitting into a plurality of spots in said at least one subsequent image frame.

8. The method according to claim 1, further comprising the steps of:
  (e) in said at least one image frame, detecting a second spot of measurable brightness; and
  (f) tracking motion of said spot and a second motion of said second spot between said at least one image frame and said at least one subsequent image frame.

9. The method according to claim 8, pairing said spot and said second spot based on comparing said motion to said second motion.

10. The method according to claim 8, said classifying said light source as a taillight when said motion and said second motion are inward.

11. The method, according to claim 8, further comprising the step of, prior to said tracking motion:
(g) compensating for yaw motion of the vehicle.

12. In a computerized system including an image sensor mounted on a moving vehicle, wherein the image sensor captures in real time an image frame, a method comprising the steps of:
(a) detecting in the image frame a plurality of spots of measurable brightness, wherein said spots are respective images of a plurality of light sources;
(b) acquiring data from said spots; and
(c) processing said data, thereby classifying said light sources based on said data;
wherein said classifying is performed by previously training with a plurality of known images, and
wherein at least one edge of at least one of said spots is detected and an intensity profile across said at least one edge is used for said classifying.

13. The method according to claim 12, wherein the image sensor includes a filter said filter having a spatial profile including at least one portion preferentially transmitting red light, further comprising the step of:
(d) correlating said spatial profile with at least one of said spots.

14. The method according to claim 12, wherein said known images include images from light sources selected from the group consisting of: taillights, headlights of an oncoming vehicle, streetlights, and traffic signs.

15. The method according to claim 12, further comprising the steps of:
(d) upon classifying said light sources as taillights of a leading vehicle, determining distance to said leading vehicle; and
(e) adaptively controlling headlights of the moving vehicle based on said distance.

16. The method according to claim 12, further comprising the step of:
(d) upon classifying said light sources as at least three streetlights along a road, determining curvature of said road; and
(e) adaptively controlling headlights of the moving vehicle based on said curvature.

17. The method according to claim 12, wherein said detecting includes determining a quadrant of said spots within said image frame, further comprising the step of:
(d) controlling solely one headlight of the moving vehicle based on said quadrant.

18. The method according to claim 12, wherein said training and said classifying are performed using radial basis functions.

19. The method according to claim 12, wherein said classifying uses pairs of said spots to identify vehicle taillights.

20. The method according to claim 12, wherein said classifying includes spatial alignment of at least a portion of said spots to detect streetlights.

21. The method according to claim 12, wherein texture characteristics of said spots are used for said classifying.

22. The method according to claim 12, wherein for each of said spots, said classifying uses said data from an area centered around each said spot including N by N picture elements of the image frame.

23. The method according to claim 12, further comprising the steps of:
(g) computing a function of image gradients for a patch of intensity of at least one of said spots;
(h) for said at least one spot computing a ratio of the number of pixels above a threshold to the size of said patch; and
(i) if said ratio is below a threshold, said classifying said sign based on said intensity profile across said at least one edge, otherwise if said ratio is below said threshold, delaying said classifying until further image frames from the image sensor are available and processed.

24. In a computerized system including an image sensor mounted on a moving vehicle, wherein the image sensor captures in real time an image frame, a method comprising the steps of:
(a) detecting in the image frame a spot of measurable brightness, wherein said spot is an image of at least one light source, said spot including a cluster of patches of intensity;
(b) acquiring data from said spot; and
(c) processing said data, thereby classifying said at least one light source based on said patches,
wherein said classifying is based on a symmetry of said cluster, wherein said at least one light source is classified as a traffic sign based on a lack of said symmetry, and
wherein the image sensor has a high dynamic range with a linear response corresponding to more than eight bits or by having a nonlinear response to light intensity and wherein said acquiring data is performed using said high dynamic range.

25. The method according to claim 24, wherein said symmetry is radial, said at least one light source is classified as a headlight.

26. The method according to claim 24, wherein said cluster includes two upper and two lower said patches of intensity, said at least one light source is classified as two headlights and two reflections thereof.

27. The method according to claim 24, further comprising the step of, prior to said classifying:
(d) training a classifier on a plurality of image moments of a plurality of clusters imaged from known light sources.

* * * * *